United States Patent [19]

Hansen et al.

[11] Patent Number: 4,488,188
[45] Date of Patent: Dec. 11, 1984

[54] BURIED SERVO RECORDING SYSTEM USING PHASE ENCODED SERVO PATTERN

[75] Inventors: Neils H. Hansen; Munro K. Haynes, both of Tucson, Ariz.

[73] Assignee: International Business Machines Corporation, Armonk, N.Y.

[21] Appl. No.: 438,218

[22] Filed: Nov. 1, 1982

[51] Int. Cl.³ .............................................. G11B 5/58
[52] U.S. Cl. .................................................... 360/77
[58] Field of Search .................. 360/77, 78, 131, 135; 369/43, 44

[56] References Cited

U.S. PATENT DOCUMENTS

| | | | |
|---|---|---|---|
| 3,404,392 | 10/1968 | Sordello | 340/174.1 |
| 3,765,005 | 10/1973 | Cannon | 340/174.1 G |
| 3,821,798 | 6/1974 | Cannon | 360/51 |
| 3,956,769 | 5/1976 | Beecroft et al. | 360/77 |
| 4,213,148 | 7/1980 | Clemens | 358/128.6 |
| 4,286,296 | 8/1981 | Cunningham | 360/77 |
| 4,318,141 | 3/1982 | Haynes | 360/77 |
| 4,432,026 | 2/1984 | Coleman, Jr. | 360/77 |

OTHER PUBLICATIONS

"Recording Servo Information Below a Data Surface in a Homogeneous Medium", T. A. Schwarz; IBM Technical Disclosure Bulletin, vol. 17, No. 2 Jul. 1974, pp. 536–539.

Primary Examiner—George G. Stellar
Attorney, Agent, or Firm—Walter J. Madden, Jr.

[57] ABSTRACT

A track following servo system for a magnetic disk file employs a buried servo pattern having two types of signals therein. The first is a reference signal of frequency f and the second type are control signals of frequency 2f, adjacent control signals being 180° out of phase with each other.

8 Claims, 4 Drawing Figures

SERVO-DETECTION CIRCUITS FOR PHASE-ENCODED SERVO

SERVO-DETECTION CIRCUITS FOR PHASE-ENCODED SERVO

BURIED SERVO RECORDING SYSTEM USING PHASE ENCODED SERVO PATTERN

CROSS-REFERENCE TO RELATED APPLICATION

Copending application Ser. No. 438,219, filed Nov. 1, 1982 discloses a servo pattern using a reference signal and control signals, the control signals having an orthogonal phase relationship to each other by cyclically revolving in phase by 90°, 180°, 270° and repeating this pattern every four tracks.

BACKGROUND OF THE INVENTION

1. Field of the Invention

This invention relates to magnetic recording disk files employing track following servo systems.

2. Description of Prior Art

The present invention relates to magnetic recording disk file information recording systems, and particularly to those systems employing continuous servo information for track following operations to enable high track densities with high lineal densities. Early magnetic recording disk files employed open loop positioning systems for controlling the movement of one or more magnetic heads to different concentric recording tracks on a magnetic disk or disks. With the demand for increased track density, closed loop servo systems were employed utilizing a separate disk surface dedicated to track following servo information, as first commercially exemplified by the IBM3330 disk file.

In some disk files, particularly in lower cost files such as the IBM 62PC, sector servo systems have been utilized, in which sectors of track-following information are interspersed around the disk surface between adjacent data areas. While such sector servo systems have the advantage that the servo information resides on the same disk as the data tracks on which track following is to take place, they have the disadvantage that they inherently reduce the area available for recording data.

It has long been recognized that a buried servo system, in which the servo information and data coexist in a disk, would be desirable. Even though such techniques have been known to be desirable, they have never been commerically exploited, apparently because of the degradation of the so-called buried servo or trackposition indicating signals or the expense of providing a multiple layer magnetic coating, one for positionindicating servo signals and another for the data signals.

An early teaching of superposed data and servo signals is found in U.S. Pat. No. 3,404,392. This patent teaches using a dual layer magnetic coating on a disk substrate. A lower layer has a higher retentivity and coercivity than the upper layer. A servo signal is first recorded in the lower layer for indicating track positions. Following such recording, data signals are recorded. Then both the servo and data signals are sensed. For each data recording operation, an erase gap precedes a read/write gap so that the data signals can be successfully recorded in the upper layer. During readback, not only are the data signals read back by a single gap, but also two sets of servo signals are simultaneously read back. These servo signals are linearly recorded sinewaves written in concentric circular tracks and exhibiting a low frequency. Adjacent servo tracks are written at different frequencies and each data track is defined as being superposed over one-half of an odd numbered servo track and one-half of an even numbered servo track. This patent teaches that the data signals and the servo signals must exist in the magnetic medium independently of the other. It also teaches that in a dual layered record medium, recording the data signals at a high frequency, at least three or four times the frequency of the servo signals in the lower layer, enables the data signals to be separated from the servo signals by filtering. The independence requirement was met in this patent by providing a record disk having a lower level layer with a higher coercivity than an upper data signal level layer. This arrangement allows the servo signals to remain undisturbed by subsequent writing and rewriting of data signals in the upper layer.

A later development is shown in the IBM Technical Disclosure Bulletin, Vol. 17, No. 2, July 1974, beginning at page 536. This shows a single magnetic coating on a substrate and teaches that the ratio of the frequency of the data signals to the servo signal should be 10:1 and that the servo signal can be successfully recorded with a head having sufficient ampere-turns capability.

U.S. Pat. No. 3,765,005 teaches using a clock-bias signal at the upper end of a data signal frequency spectrum. Also U.S. Pat. No. 3,821,798 shows a low frequency control signal recorded at a lower end portion of the data signal pass band.

A later reference showing buried servo is U.S. Pat. No. 3,956,769, which teaches the use of two separate gaps in a transducer; one for servo signals and one for data signals.

A still later reference is U.S. Pat. No. 4,318,141 in which a single-gap transducer simultaneously senses recorded control or servo signals and record data signals. A magnetic medium used is preferably a single layer magnetic medium. The head gap length and pole-tip face length allow different portions of the pole pieces in a magnetic transducer to be utilized during the simultaneous read and record operations. The servo signals are preferably deep and hard recorded into the layer, whereas the data signals are preferably pulse width limited and recorded adjacent the surface portion of the magnetic layer.

SUMMARY OF THE INVENTION

This invention is directed to a track following servo system employing adjacent phase encoded servo signals of the same frequency which produce zero output in the position error signal (PES) when the head is centered over a data track.

DESCRIPTION OF THE PREFERRED EMBODIMENT

The phase encoded buried servo system of the present invention overcomes the problems of the above prior art systems.

Figure 1:
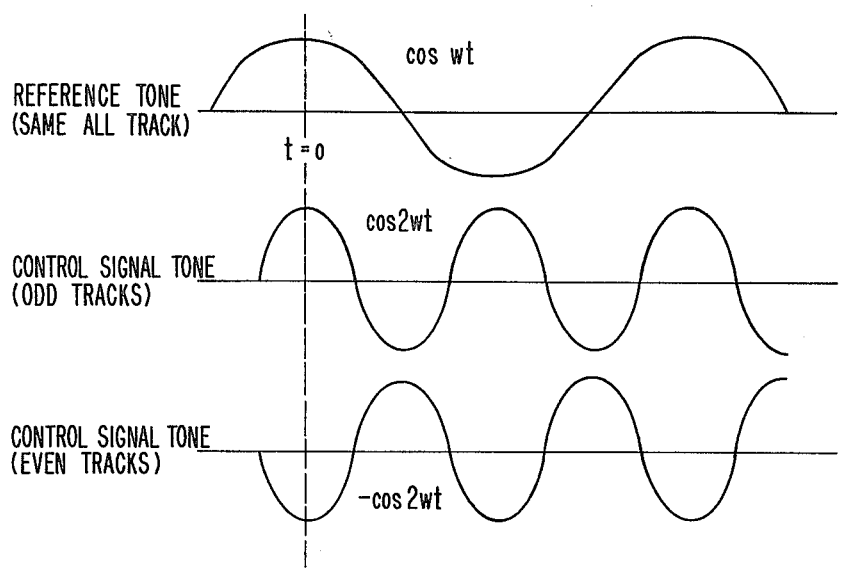
FIG. 1 shows the waveforms of the phase encoded servo signals employed in the present invention.
Figure 2:
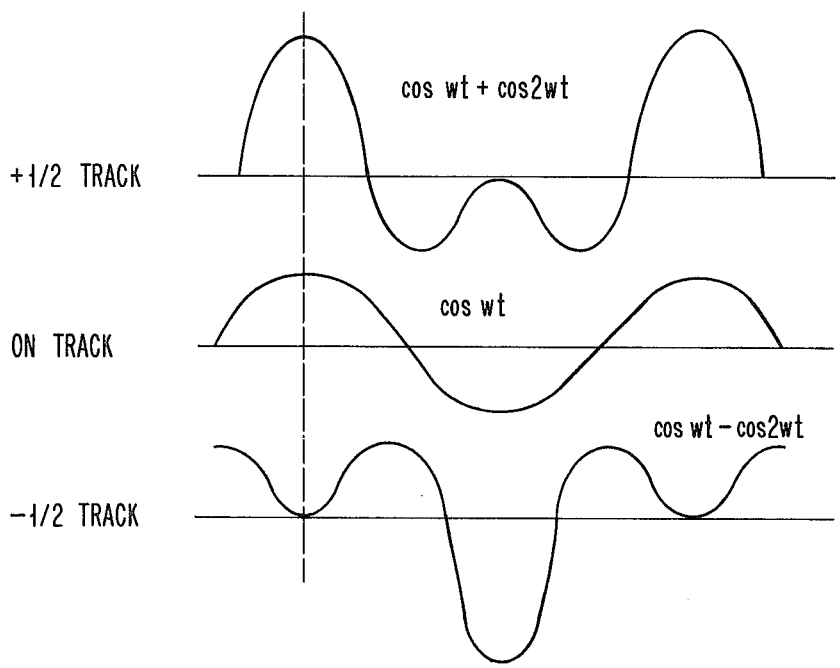
FIG. 2 shows the output signals produced by a read head for on-track and off-track positions of the head.
Figure 3:
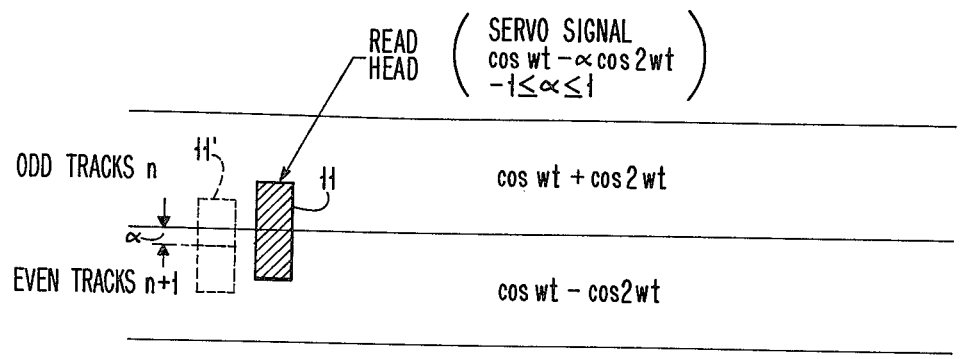
FIG. 3 shows two positions of a head relative to a pair of servo tracks.

In the present phase encoded buried servo, a reference tone, f, is recorded in each track with the same phase relationship. The head reads the same signal with respect to the reference tone regardless of its track position. In addition, a second tone that is a multiple of the reference tone is added to the reference tone. In the preferred embodiment the second or control signal tone will have a frequency twice the reference tone. The signal tone alternates phase every other track. One track is written in phase with the reference tone and the next is 180° out of phase with the reference tone, as shown in FIG. 1. FIG. 3 shows the head position with respect to the servo tracks during data read/write. When the head 11 is positioned exactly between the two servo tracks, the head will read half the signal tone from each track. Since these tones are 180° out of phase with each other, they will add to zero in the head. Thus, there will be no output from the head at the signal tone frequency when the head is between the two servo tracks. This is the "on-track" condition for data read/write. If the head moves more to one side or the other, as represented for example by position 11', a signal tone will appear. It will have different phase depending upon the direction the head moves from "on-track". These servo signals are shown on FIG. 2 for the "on-track" position, the $+\frac{1}{2}$ track off track position and the $-\frac{1}{2}$ track off track position. The reference tone is always read by the head and appears the same regardless of the head position. It is only the signal tone that varies with head position.

The head track position is thus determined by the amount of the signal tone present in the head output. The polarity of the head position is determined from the phase relationship between the signal tone and the reference tone. Only the phase relation of the reference tone is used to determine the polarity; its amplitude is not critical. The amplitude could be used, however, to develop an AGC for the head preamplifier. The reference tone could also be used for data clocking if desired.

In the two-frequency buried servo scheme described above, amplitude differences in the two frequencies cause a DC offset error in the PES signal resulting in a non-zero PES value when the head is actually on track. In the phase encoded servo, amplitude differences between the reference and the signal tones may result in detector gain variations, but not DC offsets. In a closed loop servo system some gain variations can be tolerated. If the servo signals could be recorded perfectly and the head placed exactly between the servo tracks, the signal tone would be zero. For one implementation, the reference and signal tones were written with AC basis. In this way they could be written without harmonics, which is important for buried servo applications. It should also be mentioned that the recorded servo signals are the addition of the reference and signal tones. This addition does not produce any new frequencies; in the ideal case only these two frequencies are present.

Figure 4:
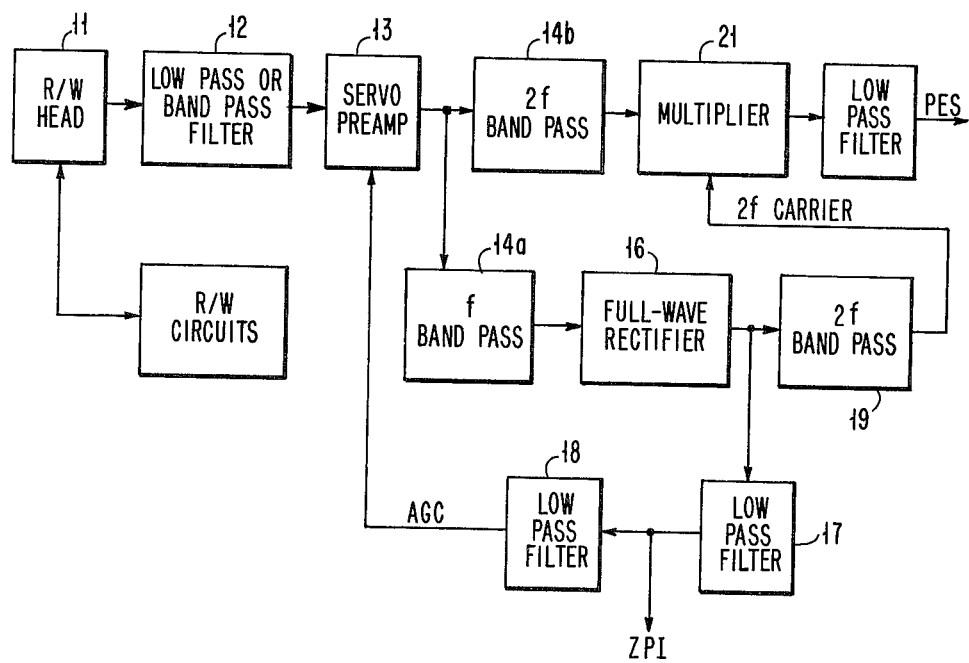
FIG. 4 is a functional block diagram of one embodiment of circuitry for implementing the present invention.

FIG. 4 shows a circuit diagram, in functional block form, for the detection circuits for the phase-encoded servo of the present invention. The output from read/write head 11 is supplied through a low pass or bandpass filter 12 to a servo preamplifier 13. After the servo preamplifier 13, the f reference and 2f signal components are separated by filters 14a and 14b, respectively. The f reference is then used to generate a 2f demodulating carrier, by full-wave rectification in rectifier 16, and a 2f bandpass filter 19 to generate a 2f carrier which is supplied to a multiplier 21 which also receives a 2f signal from bandpass filter 14b. The DC component of the rectified f signal (or the amplitude, as found by other equivalent methods) is derived through low pass filters 17, 18 for use as an Automatic Gain Control (AGC) signal to control the gain of preamplifier 13 so as to maintain a constant gain through the servo channel. If a short gap has been written in the f reference, this can be detected in the rectified output from filter 17 for use as a zero-position indicator (ZPI) signal. This system is simpler and more reliable than the two-frequency one. The filtering is easier since the reference and signal frequencies are farther apart, and there is no need for equal gains. Also, the separation bandpass filters 14a, 14b are not critical, since when on-track there is very little 2f signal to interfere with the f, and since any f signal getting into the multiplier will not affect the PES. Since this cancellation of the two signal components occurs in the head, the circuits are almost incapable of introducing an offset error.

Since the 2f signal is nearly zero when accurately following a track, it is most convenient to use the reference f for all auxiliary functions, such as AGC, ZPI, media velocity control, counting for position locating along a track, and for track identification (ID). This system also has the advantage that there are no disturbances introduced into the PES by the insertion of ZPI, track ID's, sector marks, etc. when these are encoded in the f reference. Extensive filtering was previously needed in a two-frequency system to avoid affecting the PES, and is no longer needed. The write clock can also be derived from f.

The block diagram in FIG. 4 shows one possible embodiment of the detector, but many variations are possible. The basic requirement is to derive a 2f carrier from the f reference, and use it with a multiplier, or other product detector or synchronous detector, to extract the magnitude and polarity of the PES. Not shown in the drawings is that the 2f carrier supplied from the 2f bandpass filter 17 to multiplier 21 must be adjusted for correct phase relationship with the 2f signal from filter 14b. Minor variations in phase will affect only servo loop gain, and cannot introduce an offset.

It is inherent in this method of synchronous detection, or coherent detection, that any component of the 2f signal which is in quadrature, or shifted by 90° from the proper phase, will not be detected or affect the PES. It is therefore possible to deliberately introduce a quadrature component for other uses. For example, odd tracks could be written as [COS ωt+COS 2ωt+COS (2ωt+90°)]; where the first terms are the reference, the second terms the signal, and the last terms the quadrature component. The quadrature component can be modulated at will with no affect on the PES signal. By shifting the demodulating carrier 90°, the quadrature component can be detected with a second multiplying detector, without being affected by the PES.

The quadrature signal can then be used for ZPI, AGC, Track ID's Sector Marks, generating write data clock, counting for position, thus giving a system designer greater flexibility in design and trade-offs. If in-phase and quadrature servos are both written, then a two-phase servo signal can be generated which can track at any desired offset head position.

The phase-encoded form of buried servo is ideally suited to carrying ID Information, such as track number, since the PES is directly derived from only one frequency signal; the lower or reference frequency is used only for phase reference purposes and for AGC.

The reference frequency can be recovered with a phase-locked loop which can tolerate quite long gaps in its input without affecting the PES, so that ID's can be inserted into the reference frequency without deleterious effects on the PES.

The ID coding could be inserted in the reference frequency into every other recorded servo track. For example, the track number, minus the lowest order bit, could be recorded so as to be read when following either of the tracks identified by that number and either a "0" or "1" as least order bit. The interleaved servo tracks, between those carrying ID's, would have a gap in the recorded reference frequency in positions adjacent to the ID's. The upper or signal frequency would be recorded as previously disclosed, with no gaps or other differences due to the ID encoding.

The information necessary to distinguish between track N and N+1 is provided by the servo system where a control determines whether it will follow an even or an odd track number.

As an example, assume data written at 6.2 Mbits/second, and that the reference frequency is 1/63 of the clock frequency, or 100 KHz. The servo signal frequency is then 200 KHz. If ID's are encoded by amplitude modulation (on-off) of the reference frequency, it could be chosen to let 2 cycles of the 100 KHz represent one bit of the ID code. One bit (2 cycles) off could be used as an initial indicator, followed with 5 bits (10 cycles) coded to represent one of 32 possibilities. This would be adequate to determine track location to within 64 data tracks, which should be all that is needed. This, in turn, could be followed by one bit (2 cycles) for a parity bit for error detection purposes. With an odd parity, this would cause a worst case interruption of the reference for only 12 cycles, which is not enough to affect recovery of the reference.

We claim:

1. A track-following buried servo system for positioning a magnetic head over a selected one of a plurality of data tracks on one or more disks in a magnetic recording disk file, comprising
    a servo pattern recorded on each of said disks along with said data tracks,
    said servo pattern comprising a plurality of servo tracks,
    each said servo track having a reference signal recorded therein, said reference signal having the same frequency and phase in each of said servo tracks,
    each said servo track also having a control signal recorded therein, said control signals having a higher frequency than said reference signals, the control signals in adjacent ones of said servo tracks being 180° out of phase with each other, the boundary between adjacent servo tracks defining the centerline of one of said data tracks, and
    means for detecting the amount of each type of said control signal in the total signal reproduced by said head to produce an indication of the position of said head relative to one of said data track centerlines.

2. Apparatus in accordance with claim 1 in which said control signals have a frequency which is twice the frequency of said reference signal.

3. Apparatus in accordance with claim 1 including means for comparing the phase relationship between the reference signal reproduced by said head and the control signal reproduced by said head to determine in which direction said head is displaced from one of said data track centerlines.

4. Apparatus in accordance with claim 3 in which said control signals have a frequency which is twice the frequency of said reference signal.

5. Apparatus in accordance with claim 1 including
    amplifier means for amplifying said signal reproduced by said head,
    means for detecting the amplitude of the reference signal reproduced by said head, and
    means for utilizing said detected amplitude to generate an automatic gain control signal for said amplifier means.

6. Apparatus in accordance with claim 1 in which said reference signals have encoded gaps therein carrying track identification information.

7. Apparatus in accordance with claim 6 in which said encoded gaps are provided in alternate ones of said reference signals.

8. Apparatus in accordance with claim 6 in which said reference signals contain a gap to generate a zero position indication for each revolution of said disk.

* * * * *

UNITED STATES PATENT AND TRADEMARK OFFICE
CERTIFICATE OF CORRECTION

PATENT NO. : 4,488,188
DATED : Dec. 11, 1984
INVENTOR(S) : Neils H. Hansen and Munro K. Haynes It is certified that error appears in the above—identified patent and that said Letters Patent is hereby corrected as shown below:

Column 5, line 21, "6.2" should be --6.3--.

Signed and Sealed this

Fourteenth Day of May 1985

[SEAL]

Attest:

DONALD J. QUIGG

Attesting Officer     Acting Commissioner of Patents and Trademarks